United States Patent
De Graaf et al.

(10) Patent No.: US 9,021,100 B1
(45) Date of Patent: *Apr. 28, 2015

(54) TUNNELING DHCP OPTIONS IN AUTHENTICATION MESSAGES

(75) Inventors: Kathryn De Graaf, Northboro, MA (US); Paul Raison, Windham, NH (US); John Liddy, Gardner, MA (US); John C. Scano, Dracut, MA (US); Sanjay Wadhwa, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/592,031

(22) Filed: Aug. 22, 2012

Related U.S. Application Data

(63) Continuation of application No. 12/694,081, filed on Jan. 26, 2010, now Pat. No. 8,260,902.

(51) Int. Cl.
*G06F 15/173* (2006.01)
*H04L 29/12* (2006.01)
*H04L 29/06* (2006.01)

(52) U.S. Cl.
CPC ............ *H04L 61/2015* (2013.01); *H04L 63/08* (2013.01)

(58) Field of Classification Search
USPC ......... 709/203, 220, 223, 225, 228, 230, 226; 726/4; 706/203, 217, 223–226, 236
See application file for complete search history.

(56) References Cited

U.S. PATENT DOCUMENTS 6,243,749 B1   6/2001   Sitaraman et al.
6,397,259 B1 * 5/2002   Lincke et al. ................. 709/236
(Continued)

FOREIGN PATENT DOCUMENTS

JP    2004356920 A   12/2004
WO      03081875 A1  10/2003
WO    2005050897 A2   6/2005

OTHER PUBLICATIONS

McAuley et al. "Experience with Autoconfiguring a Network with IP Addresses", Proceedings: Communications for Network-Centric Operations: Creating the Information Force, Oct. 28-30, 2001, Mclean, VA, Telcordia Technologies, Inc., 2001, p. 272-276.
(Continued)

*Primary Examiner* — Ramy M Osman
(74) *Attorney, Agent, or Firm* — Shumaker & Sieffert, P.A.

(57) ABSTRACT

An example network device includes network interfaces and a control unit that receives a network configuration request from a client device and sends a network configuration response to the client device. The control unit comprises a network configuration protocol module that generates an authentication request in accordance with a network authentication protocol such that the authentication request includes a request for a second set of network configuration parameters based on a request for a first set of network configuration parameters in the network configuration request, and generates the network configuration response in accordance with the network configuration protocol, wherein the network configuration response is based on an authentication response generated by a second network device in accordance with the network authentication protocol, wherein the authentication response comprises a third set of network configuration parameters based on the request for the second set of network configuration parameters.

18 Claims, 6 Drawing Sheets

(56) References Cited

U.S. PATENT DOCUMENTS

| | | | |
|---|---|---|---|
| 6,578,074 B1 | 6/2003 | Bahlmann | |
| 6,957,276 B1 | 10/2005 | Bahl | |
| 6,982,953 B1 | 1/2006 | Swales | |
| 7,178,059 B2 | 2/2007 | Greenspan et al. | |
| 7,197,549 B1 | 3/2007 | Salama et al. | |
| 7,292,538 B1 | 11/2007 | O'Rourke et al. | |
| 7,321,893 B1 | 1/2008 | Rambacher et al. | |
| 7,386,629 B2 | 6/2008 | Rover et al. | |
| 7,533,165 B2 | 5/2009 | Makino | |
| 7,624,181 B2* | 11/2009 | Townsley et al. | 709/225 |
| 7,648,070 B2 | 1/2010 | Droms et al. | |
| 7,792,942 B1 | 9/2010 | Regan et al. | |
| 7,924,798 B1* | 4/2011 | Brown et al. | 370/341 |
| 7,949,751 B1* | 5/2011 | Potter et al. | 709/226 |
| 7,983,418 B2 | 7/2011 | Oyama et al. | |
| 7,991,863 B2 | 8/2011 | Zhao | |
| 8,036,237 B2 | 10/2011 | Kolli et al. | |
| 8,086,713 B2 | 12/2011 | Gandhewar et al. | |
| 8,260,902 B1* | 9/2012 | DeGraaf et al. | 709/223 |
| 2003/0076805 A1 | 4/2003 | Agrawal et al. | |
| 2005/0044273 A1 | 2/2005 | Bouchat et al. | |
| 2005/0097223 A1 | 5/2005 | Shen et al. | |
| 2005/0122946 A1 | 6/2005 | Won | |
| 2005/0253718 A1 | 11/2005 | Droms et al. | |
| 2005/0253722 A1 | 11/2005 | Droms et al. | |
| 2005/0286518 A1 | 12/2005 | Park et al. | |
| 2006/0031488 A1 | 2/2006 | Swales | |
| 2006/0047791 A1 | 3/2006 | Bahl | |
| 2006/0155563 A1 | 7/2006 | Banerjee et al. | |
| 2007/0002833 A1 | 1/2007 | Bajic | |
| 2007/0180499 A1* | 8/2007 | Van Bemmel | 726/4 |
| 2007/0203999 A1* | 8/2007 | Townsley et al. | 709/220 |
| 2007/0214352 A1 | 9/2007 | Convery et al. | |
| 2008/0046597 A1 | 2/2008 | Stademann et al. | |
| 2008/0065747 A1 | 3/2008 | Kubota | |
| 2008/0092213 A1* | 4/2008 | Wei et al. | 726/4 |
| 2008/0282325 A1* | 11/2008 | Oyama et al. | 726/4 |
| 2009/0092045 A1 | 4/2009 | Wu et al. | |
| 2009/0154406 A1 | 6/2009 | Kim et al. | |
| 2009/0257425 A1 | 10/2009 | Sastry et al. | |
| 2010/0042707 A1 | 2/2010 | Zhao | |
| 2010/0042714 A1 | 2/2010 | Choi et al. | |
| 2010/0191839 A1 | 7/2010 | Gandhewar et al. | |
| 2011/0154440 A1 | 6/2011 | De Graaf et al. | |

OTHER PUBLICATIONS

Droms, R. and R. Cole,"An Inter-server Protocol for DHCP; draft-ietf-dhc-interserver-01.txt" Network Working Group, Internet Draft, Mar. 1997, p. 1-31.

Juniper Networks, Inc., "JUNOS Software Subscriber Access Configuration Guide—DHCP Auto Logout Overview", Release 9.4, Jan. 15, 2009, retrieved from the internet: URL: http://www.juniper.net/techpubs/en_US/junos9.4/information-products/topic-collections/subscriber-access/swconfig-subscriber-access.pdf, 38 pp.

Droms, R., "Dynamic Host Configuration Protocol", RFC 2131, IETF Standard, Internet Engineering Task Force, Mar. 1997, 46 pp.

Alexander, S. et al., "DHCP Options and BOOTP Vendor Extensions", RFC 2132, IETF Standard, Internet Engineering Task Force, Mar. 1997, 35 pp.

Patrick, M., "DHCP Relay Agent Information Option", RFC 3046, IETF Standard, Internet Engineering Task Force, Jan. 2001, 15 pp.

Reynolds et al., "Assigned Numbers," RFC 1700, Oct. 1994, 215 pp.

Rigney et al., "Remote Authentication Dial in User Service (Radius)," RFC 2865, Jun. 2000, 71 pp.

Droms et al., "Dynamic Host Configuration Protocol," RFC 2131, Mar. 1997, 43 pp.

Alexander et al., "DHCP Options and BOOTP Vendor Extensions," RFC 2132, Mar. 1997, 32 pp.

* cited by examiner

TUNNELING DHCP OPTIONS IN AUTHENTICATION MESSAGES

CROSS REFERENCE TO RELATED APPLICATIONS

This application is a continuation of application Ser. No. 12/694,081, filed Jan. 26, 2010, which is incorporated by reference in its entirety.

TECHNICAL FIELD

The invention relates to computer networks and, more particularly, configuring network devices.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

To route the packets through the computer network, each network device may be assigned an address that uniquely identifies each of the requesting network devices. Each packet may then include a source address uniquely identifying the network device that originated the packet and a destination address uniquely identifying the network device to which the packet is destined. Intermediate devices, referred to as routers, may route the packets to the destination device based on the destination address included within the packet.

Typically, each network device, upon attempting to access the network, requests configuration information that includes a network address, such as an Internet Protocol (IP) address, in accordance with a Dynamic Host Configuration Protocol (DHCP) and may require authentication by an authentication server. For example, a subscriber device (e.g., a cable modem, a digital television setup box, a Digital Subscriber Line (DSL) modem) commonly requests a layer three (L3) IP network address by issuing a DHCP request containing, in part, a set of DHCP options and authentication information.

A DHCP server that maintains an IP address space receives the DHCP request from the subscriber device. The DHCP server interprets the set of DHCP options, authenticates the subscriber device by contacting an authentication server, determines a set of appropriate options for the requesting network device in accordance with configuration information controlling allocation of DHCP options, and forwards a response back to the network device containing the determined set of options for the network device. Each DHCP server may need to be particularly configured to forward the set of appropriate options for the network device.

SUMMARY

In general, techniques are described for tunneling a set of Dynamic Host Control Protocol (DHCP) options between a DHCP server and a centrally located device, such as an authentication server, via an authentication protocol so that the centrally located device may allocate DHCP options. By tunneling these options to the central location, only one device need be configured to allocate appropriate DHCP options rather than separately configuring each of, what may be, numerous DHCP servers to locally allocate appropriate DHCP options. Consequently, the techniques may lessen administrative burdens in that only one device need be configured rather than multiple devices. Moreover, the techniques may also give an administrator greater control over the process for determining the contents of the DHCP options field, considering that the authentication server is often customizable for a particular service provider, the contents of the DHCP options provided by the authentication server may also be customized for a particular service provider.

In operation, a DHCP server receives a DHCP request from a client device that includes authentication information and a set of DHCP options. The DHCP server implements various aspects of the techniques to send the set of DHCP options and the authentication information to a centrally located authentication server. The authentication server may modify the set of DHCP options based upon the authentication information received from the DHCP server and based upon the authentication server's configuration parameters. The DHCP server receives an authentication response that includes authentication information and the set of DHCP options from the authentication server.

The client device and the DHCP server typically communicate in accordance with the a network protocol, such as the DHCP protocol described in RFC 2131, the entire contents of which is incorporated herein by reference. For example, when requesting DHCP configuration information from the DHCP server, the client device sends a standard DHCP discover packet to the DHCP server. In response to receiving the DHCP discover packet, the DHCP server sends a standard DHCP offer packet back to the client device. The DHCP discover packet and the DHCP offer packet each may include a set of DHCP options that specify various DHCP configuration options such as lease time offered, renewal time, rebind time, a set of vendor options, as well as several other options. Multiple DHCP servers may send a DHCP offer packet to the client device, but the client device may elect to only accept one DHCP offer. The client device broadcasts a DHCP request packet, which identifies the particular DHCP offer packet the client device accepted. The DHCP server whose DHCP offer was accepted by the client device then sends a DHCP acknowledgment ("DHCP ack") packet to the client device. The DHCP ack packet includes the lease duration and any other configuration information requested by the client device. The client device configures itself according to the DHCP offer and the DHCP ack packets received from the DHCP server.

The DHCP server and the authentication server communicate using an authentication protocol. In one example, the authentication server operates in accordance with the Remote Access Dial In User Service (RADIUS) protocol, as described in RFC 2865, the entire contents of which is incorporated herein by reference, and, for this reason, the server is commonly referred to as a RADIUS server. The DHCP server receives the DHCP discover packet from the client device and generates a RADIUS Access-Request packet based on the DHCP discover packet. The DHCP Server may modify the DHCP options received in the DHCP discover packet before including the DHCP Option in a RADIUS Access-Request field. The DHCP server encodes the DHCP options into one or more Type Length Values (TLVs) which are stored in the Attributes field of the RADIUS Access-Request packet. The maximum TLV size supported by the RADIUS protocol is less than the required DHCP options field size as specified by the DHCP protocol. Therefore, the DHCP options may need to be truncated to fit within a single TLV or the DHCP options may need to be fragmented and spanned across more than one TLV.

The RADIUS server receives the RADIUS Access-Request packet, processes the packet, and, upon successful authentication, generates a RADIUS Access-Accept packet based on the Access-Request packet. If the DHCP server truncated the DHCP options or fragmented the DHCP options across more than one TLV during the encoding process, the RADIUS server may translate or reassemble the DHCP options, as appropriate, to recreate the DHCP options. The RADIUS server may be programmed to directly manipulate the truncated DHCP options without translating the truncated DHCP options into conventional DHCP options. The RADIUS server attempts to authenticate the client device based on the Access-Request packet and may modify the DHCP options based on the authentication attempt. In generating a RADIUS Access-Accept packet, the RADIUS server re-encodes the DHCP options in the same manner as received in the RADIUS Access-Request packet and includes the authentication response.

The DHCP server receives the RADIUS packet generated in response to the RADIUS Access-Request packet from the RADIUS server and generates a DHCP offer packet based on the RADIUS packet. The DHCP server may pass the DHCP options included in the RADIUS packet directly into the DHCP offer packet, or modify the DHCP options in accordance with the configuration of the DHCP server. The DHCP options are incorporated into the DHCP offer packet, which is then sent to the client device.

In one example, a method includes receiving, with a first network device from a client device, a network configuration request in accordance with a network configuration protocol, wherein the network configuration request comprises a request for a first set of network configuration parameters for configuring the client device, and generating, with the first network device, an authentication request in accordance with a network authentication protocol, wherein the authentication request comprises a request for a second set of network configuration parameters, and wherein the request for the second set of network configuration parameters are based on the request for the first set of network configuration parameters. The method may also include receiving, with the first network device from a second network device, an authentication response generated by the second network device in accordance with the network authentication protocol, wherein the authentication response comprises a third set of network configuration parameters, and wherein the third set of network configuration parameters is based on the request for the second set of network configuration parameters. The method may also include generating, with the first network device, a network configuration response in accordance with the network configuration protocol based on the authentication response wherein the network configuration response comprises a fourth set of network configuration parameters based on the third set of network configuration parameters, and transmitting, from the first network device to the client device, the network configuration response.

In another example, a network device comprises one or more network interfaces that send and receive network packets and a control unit that receives, via the network interfaces, a network configuration request from a client device and sends, via the network interfaces, a network configuration response to the client device, wherein the network configuration request comprises a request for a first set of network configuration parameters for configuring the client device. The control unit comprises a network configuration protocol module that generates an authentication request in accordance with a network authentication protocol such that the authentication request includes a request for a second set of network configuration parameters based on the request for the first set of requested network configuration parameters, and generates the network configuration response in accordance with the network configuration protocol, wherein the network configuration response is based on an authentication response generated by a second network device in accordance with the network authentication protocol and comprises a third set of network configuration parameters based on the second set of network configuration parameters, and wherein the network configuration response comprises a fourth set of network configuration parameters based on the third set of network configuration parameters.

In another example, a system comprises a first network device and a second network device. The first network device may include a plurality of network interfaces that send and receive network packets and a control unit that receives, via the plurality of network interfaces, a network configuration request from a client device and sends, via the plurality of network interfaces, a network configuration response to the client device, wherein the network configuration request comprises a request for a first set of network configuration parameters for configuring the client device. The control unit may include a network configuration protocol module that generates an authentication request in accordance with a network authentication protocol such that the authentication request includes a request for a second set of network configuration parameters based on the request for the first set of network configuration parameters, and generates the network configuration response in accordance with the network configuration protocol, wherein the network configuration response is based on an authentication response, wherein the authentication response comprises a third set of network configuration parameters based on the request for the second set of network configuration parameters, and wherein the network configuration response comprises a fourth set of network configuration parameters based on the third set of network configuration parameters. The second network device may include a plurality of network interfaces that send and receive network packets and a control unit that receives, via the plurality of network interfaces, the authentication request from the first network device and sends, via the plurality of network interfaces, the authentication response to the first network device. The control unit may include an authentication protocol module that generates the authentication response in accordance with the authentication protocol.

In another example, a computer-readable storage medium is encoded with instructions for causing one or more programmable processors to receive, from a client device, a network configuration request in accordance with a network configuration protocol, wherein the network configuration request comprises a request for a first set of network configuration parameters for configuring the client device and generate an authentication request in accordance with a network authentication protocol, wherein the authentication request comprises a request for a second set of network configuration parameters, and wherein the request for the second set of network configuration parameters is based on the request for the first set of network configuration parameters. The instructions further comprise instructions for causing one or more programmable processors to receive an authentication response generated by a network device in accordance with the network authentication protocol, wherein the authentication response comprises a third set of network configuration parameters, and wherein the third set of network configuration parameters are based on the request for the second set of network configuration parameters, generate a network configuration response in accordance with the network configuration protocol based on the authentication response wherein the network configuration response comprises a fourth set of network configuration parameters based on the third set of network configuration parameters, and transmit the network configuration response to the client device.

In another example, a method includes receiving, with a first network device from a second network device, an authentication request generated by the second network device, wherein the authentication request comprises a request for a first set of network configuration parameters, wherein the second network device generated the request for the first set of network configuration parameters in accordance with a network authentication protocol and based on a request for a second set of network configuration parameters for configuring a client device, and wherein the second network device received the request for the second set of network configuration parameters from the client device in accordance with a network configuration protocol. The method may also include generating, with the first network device, an authentication response in accordance with the network authentication protocol, wherein the authentication response comprises a third set of network configuration parameters, and wherein the third set of network configuration parameters is based on the request for the first set of authentication parameters, and transmitting, from the first network device to the second network device, the authentication response.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
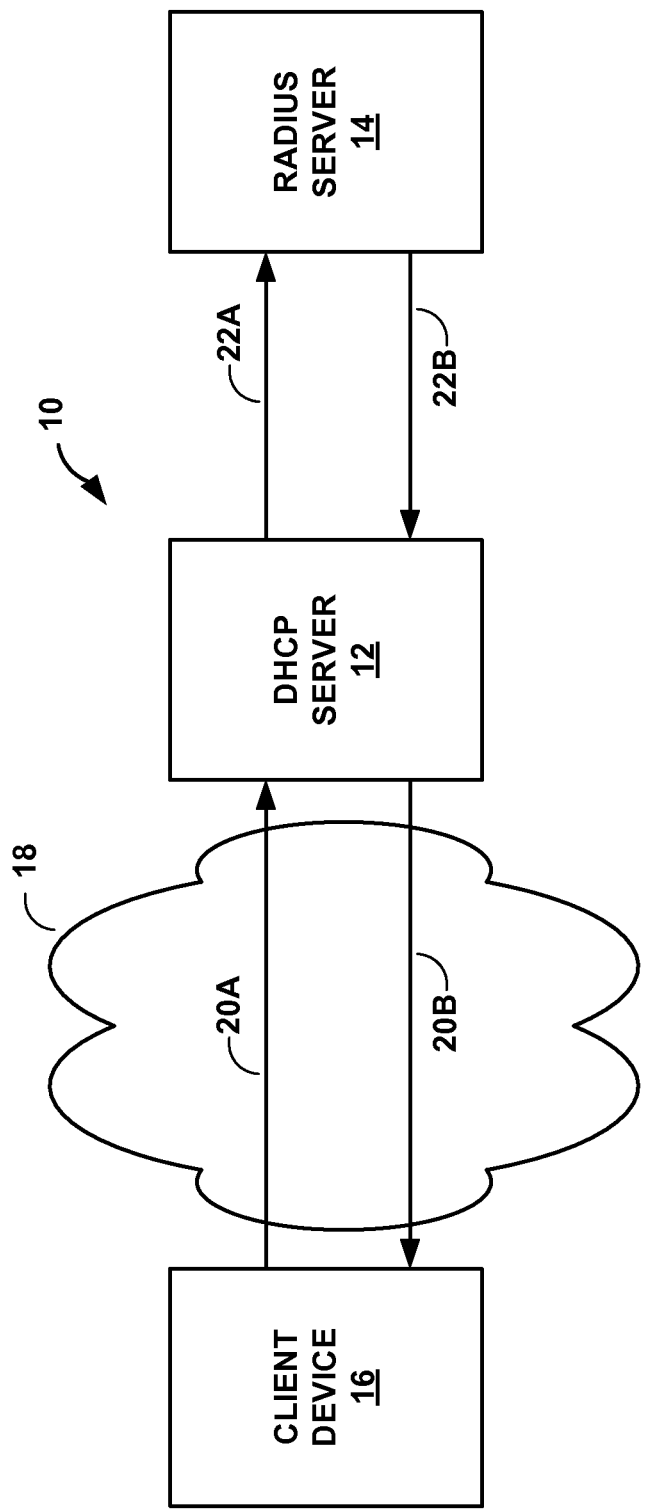
FIG. 1 is a block diagram illustrating an exemplary network system in which a DHCP server and a RADIUS server implement the DHCP options tunneling techniques described in this disclosure.

FIG. 1 is a block diagram illustrating an exemplary network system 10 in which a DHCP server 12 and a RADIUS server 14 implement the DHCP options tunneling techniques described in this disclosure. While described with respect to one particular protocol for reserving network resources, e.g., DHCP, and another particular protocol for authenticating a client device, e.g., RADIUS, the techniques may apply to any network resource reservation protocol by which a network device may request network addresses and any authentication protocol by which a network device is authenticated.

In the example of FIG. 1, network system 10 includes network 18 and client device 16, where client device 16 is coupled to DHCP server 12 via network links 20A and 20B and DHCP server 12 is coupled to RADIUS server 14 via network links 22A and 22B. Network 18 may comprise any type of network capable of transmitting data, such as a layer three (L3) packet-switched network (e.g., the Internet) operating over one or more layer two (L2) networks (e.g., an Ethernet or multi-packet label switching (MPLS) network). Reference to layers in this disclosure should be construed as reference to layers of the Open Systems Interconnection (OSI) reference model, or OSI model for short. Network 18 may include a wide variety of interconnected computing devices or nodes, such as web servers, print servers, application servers, data servers, workstations, desktop computers, laptop computers, cellular or other mobile devices, Personal Digital Assistants (PDAs), and any other device capable of connecting to a computer network via a wireless and/or wired connection.

Client device 16 may represent a subscriber device, such as one or more of a Set-Top Box (STB), a personal computer, a laptop computer, a modem, a workstation, a PDA, a cellular phone or other mobile device (e.g., a so-called "smart phone") or any other device capable of accessing a network, such as network 18. Client device 16 may implement DHCP and the RADIUS authentication protocol to request, as a client to the DHCP server 12, L3 network addresses (e.g., IP addresses) and other resources maintained by DHCP server 12 useful or required for operating within network system 10.

Network system 10 further employs RADIUS server 14 to facilitate the authentication of devices, such as client device 16. RADIUS server 14 operates in accordance with the RADIUS authentication protocol and receives and services authentication requests received from client device 16 via DHCP server 12. That is, RADIUS server 14 is responsible for the authentication of authenticating information associated with client device 16 and returning the result of the authentication to DHCP server 12. The authentication information associated with client device 16 may be provided by client device 16 and/or provided by DHCP server 12 on behalf of client device 16. Although not shown in FIG. 1, RADIUS server 14 may provide authentication services to a plurality of other network access devices similar to client device 16 by receiving and servicing authentication requests originating from these other network access devices. The authentication requests may be received via one or more different DHCP servers or received directly from the plurality of network access devices. While RADIUS server 14 is shown as an authentication server operating in accordance with the RADIUS authentication protocol, RADIUS server 14 represents one type of server operating in accordance with an authentication, authorization, and accounting protocol and may be implemented by any device capable of operating in accordance with an authentication, authorization, and accounting protocol.

DHCP server 12 may represent a network device that allocates L3 network addresses (e.g., IP network addresses) for network system 10. In particular, DHCP server 12 may maintain access to an address pool, such as an Internet Protocol (IP) address pool. DHCP server 12 may also maintain access to other resources, such as configuration files that provide pertinent configuration information. DHCP server 12 may reserve an IP address within the IP address pool for use by one or more DHCP clients, such as client device 16 in accordance with DHCP. DHCP server 12 may include a user interface (not shown) with which administrators interact to configure DHCP server 12. In accordance with the techniques of this invention, DHCP server 12 may be configured to tunnel DHCP options to a centrally located device, such as RADIUS server 14. While DHCP server 12 is shown as a network resource server operating in accordance with the DHCP resource reservation protocol, DHCP server 12 represents one type of server operating in accordance with a resource reservation protocol and may be implemented by any device capable of operating in accordance with a resource reservation protocol, such as a DHCP relay server. The DHCP options specified by client device 16 in the DHCP discover packet may be considered a request for a set of network configuration parameters as client device 16 is requesting the particular DHCP options specified in the DHCP discover packet.

Client device 16 may, upon attempting to access network 18, first request resources, such as an IP address, required for operating within network system 10. Client device 16 issues a DHCP discover packet in an attempt to discover a DHCP server, such as DHCP server 12, in accordance with DHCP. The DHCP discover packet includes an options field, often referred to as "DHCP options," that may include identification and authorization attributes as well as configurations options such as lease time requested, renewal time, rebind time, and a set of vendor options. The DHCP options may be a fixed length or a variable length and begin with a tag octet that uniquely identifies the option. Options that are of variable length include a length octet following the tag octet that specifies the length of the option and does not include the length of the tag octet and the length octet. The DHCP options specified by DHCP server 12 in the RADIUS Access-Request packet may be considered a request for a set of network configuration parameters as DHCP server 12 is requesting the particular DHCP options specified in the RADIUS Access-Request packet.

In accordance with the techniques of this disclosure, DHCP server 12 may respond to the DHCP discover packet by generating a RADIUS Access-Request packet based on the DHCP discover packet. DHCP server 12 may modify the DHCP options received in the DHCP discover packet before including the DHCP options in the Access-Request packet. The Access-Request packet includes an attributes field. DHCP server 12 encodes the DHCP options into one or more vendor specific attributes (VSAs) which are stored in the attributes field of the Access-Request packet. The maximum VSA size supported by the RADIUS protocol is less than the required DHCP options field size as specified by the DHCP protocol. Therefore, the DHCP options may need to be truncated to fit within a single VSA or the DHCP options may need to be fragmented and spanned across more than one VSA.

RADIUS server 14 receives the Access-Request packet, processes the packet, and generates a RADIUS Access-Accept upon successful authentication. If DHCP server 12 truncated the DHCP options or fragmented the DHCP options across more than one VSA during the encoding process, RADIUS server 14 may translate or reassemble the DHCP options, as appropriate, to recreate the DHCP options. RADIUS server 14 may be programmed to directly manipulate the truncated DHCP options without translating the truncated DHCP options into conventional DHCP options. RADIUS server 14 attempts to authenticate the client device based on the Access-Request packet and may modify the DHCP options based on the authentication attempt. In generating the Access-Accept packet, RADIUS 14 server re-encodes the DHCP options in the same manner as received in the Access-Request packet.

DHCP server 12 receives the Access-Accept packet from RADIUS server 14 and generates a DHCP offer packet based on the Access-Accept packet. DHCP server 12 may pass the DHCP options included in Access-Accept packet directly into DHCP offer packet, or modify the DHCP options in accordance with the configuration of the DHCP server 12. The DHCP options are incorporated into the DHCP offer packet, which is then sent to the client device 16.

While not shown for purposes of clarity and simplicity, more than one DHCP server 12 may each send a DHCP offer packet to client device 16, and client device 16 accepts one of the DHCP offer packets. Client device 16 broadcasts a DHCP request packet in response to receiving the one or more DHCP offer packets. The DHCP request packet identifies the particular DHCP offer packet corresponding to the one particular DHCP sever 12 that client device 16 accepted.

DHCP server 12 may generate a RADIUS Access-Request packet based on the DHCP request packet, receive a RADIUS Access-Accept packet from RADIUS server 14 as described above, generate a DHCP ack packet based on the RADIUS Access-Accept packet, and then send a DHCP ack packet to the client device. The DHCP ack packet may include the lease duration and any other configuration information requested by the client device.

By tunneling these options to RADIUS server 14, only one device (e.g., the RADIUS server) need be configured to allocate appropriate DHCP options rather than separately configuring each of, what may be numerous DHCP servers 12 to locally allocate appropriate DHCP options. Consequently, the techniques may lessen administrative burdens in that only one device need be configured rather than multiple devices. Moreover, the techniques may also give an administrator greater control over the process for determining the contents of the DHCP options field, considering that the authentication server is often customizable for a particular service provider, the contents of the DHCP options provided by the authentication server may also be customized for a particular service provider.

Figure 2:
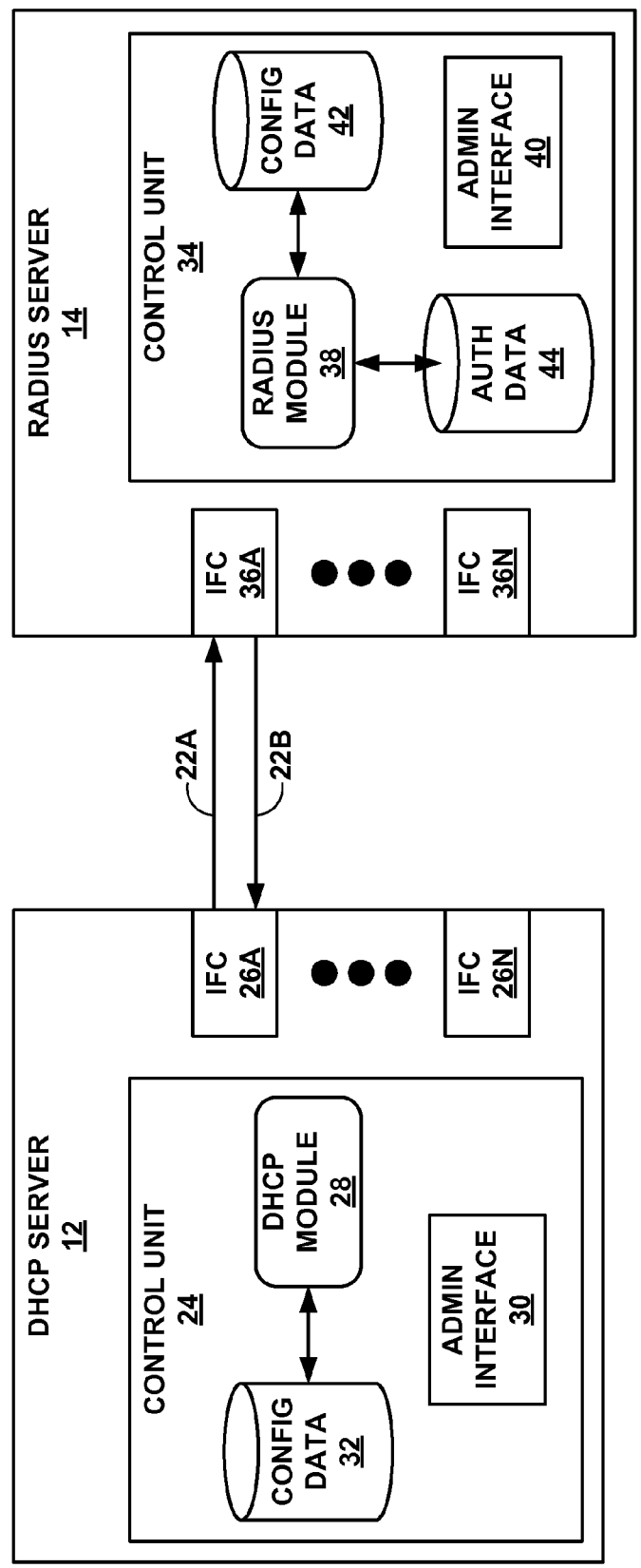
FIG. 2 is a block diagram illustrating an example DHCP server and RADIUS server that may implement the DHCP options tunneling techniques described in this disclosure.

FIG. 2 is a block diagram illustrating an example interaction between DHCP server 12 and RADIUS server 14 of FIG. 1 in more detail. As shown in FIG. 2, DHCP server 12 includes control unit 24 and network interfaces 26A-26N (collectively, "IFCs 26"). RADIUS server 14 includes control unit 34 and network interfaces 36A-36N (collectively, "IFCs 36"). DHCP server 12 and RADIUS server 14 are connected via links 22. Although links 22A and 22B are both illustrated as connecting IFCs 26A and 36A, links 22 may connect different ones of IFCs 26 and 36. For example, link 22A may connect IFC 26N with IFC 36A and link 22B may connect IFC 36N with IFC 26A. IFCs 26 and IFCs 36 may include a different number of IFCs despite being illustrated as both including "N" IFCs. "N" may specify a different number of IFCs for each DHCP server 12 and RADIUS server 14.

Control units 24 and 34 may each comprise one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control units 24 and 34 may each comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 24 includes a DHCP module 28, administrator interface 30 (illustrated as "admin interface 30"), and configuration data 32 (illustrated as "config data 32"). DHCP module 28 represents an exemplary instance of a DHCP protocol or, more generally, a network address allocation and configuration protocol. DHCP module 28 is one example of a network configuration protocol module. DHCP module 28 may receive DHCP discover and RADIUS Access-Accept messages and generate and send DHCP offer and RADIUS Access-Request messages in accordance with the techniques of this disclosure. DHCP module 28 may respond to the DHCP discover packet by generating a RADIUS Access-Request packet based on the DHCP discover packet. DHCP module 28 may modify the DHCP options received in the DHCP discover packet before including the DHCP options in the Access-Request packet. DHCP module 28 encodes the DHCP options into one or more VSAs, which are stored in the attributes field of the Access-Request packet. The maximum VSA size supported by the RADIUS protocol is less than the required DHCP options field size as specified by the DHCP protocol. Therefore, the DHCP options may need to be truncated to fit within a single VSA or the DHCP options may need to be fragmented and spanned across more than one VSA. DHCP module 28 sends the Access-Request packet to RADIUS server 14 via IFC 26A and link 22A, for example.

An administrator may configure DHCP server 12 by interacting with DHCP server 12 via administrator interface 30. Administrator interface 30 may be a command line interface (CLI), graphical user interface (GUI), a file interface that can receive data files that include configuration information, or another interface that enables an administrator to interact with DHCP server 12 to install and modify configuration information stored within configuration data 32. The configuration information may specify, for example, to tunnel DHCP options to radius server 14 and whether DHCP options that exceed the maximum VSA size are to be fragmented and spanned across more than one VSA or truncated to fit within a single VSA. Other examples of configuration information may include an IP address range that specifies an address pool, IP address lease duration, and a message response timeout.

Control unit 34 of RADIUS server 14 includes RADIUS module 38, administrator interface 40 (illustrated as "admin interface 40"), configuration data 42 (illustrated as "config data 42"), and authentication data 44 (illustrated as "auth data 44"). RADIUS module 38 represents an exemplary instance of an authentication, authorization, and accounting (AAA) protocol module or, more generally, an authentication protocol module. RADIUS module 38 enables AAA transactions by which RADIUS server 14 may authenticate and authorize a client device, such as client device 16 of FIG. 1. RADIUS module 38 receives the Access-Request packet via link 22A and IFC 36A, for example, authenticates the authentication information included within the Access-Request packet against authentication information stored within authentication data 44, and generates a RADIUS Access-Accept packet based on the results of the authentication.

If RADIUS module 38 is configured to send and receive truncated DHCP options, RADIUS module 38 may translate or reassemble the DHCP options, as appropriate, to recreate the full DHCP options. RADIUS module 38 may be configured to directly manipulate the truncated DHCP options without translating the truncated DHCP options into conventional DHCP options. RADIUS module 38 attempts to authenticate the client device based on the Access-Request packet and may modify the DHCP options based on the authentication attempt. In generating the Access-Accept packet, RADIUS module 38 re-encodes the DHCP options in the same manner as received in the Access-Request packet. In one example, RADIUS module 38 sends the Access-Accept packet to DHCP server 12 via IFC 36A and link 22B.

An administrator may configure RADIUS server 14 by interacting with RADIUS server 14 via administrator interface 40. Administrator interface 40 may be a command line interface (CLI), graphical user interface (GUI), a file interface that can receive data files that include configuration information, or another interface that enables an administrator to interact with RADIUS server 14 to install and modify configuration information stored within configuration data 42. The configuration information may specify, for example, to tunnel DHCP options to DHCP server 12, whether DHCP options that exceed the maximum VSA size are to be fragmented and spanned across more than one VSA or truncated to fit within a single VSA, and what DHCP options may be available for a particular set of authentication information received in an Access-Request packet from DHCP server 12.

Figure 3:
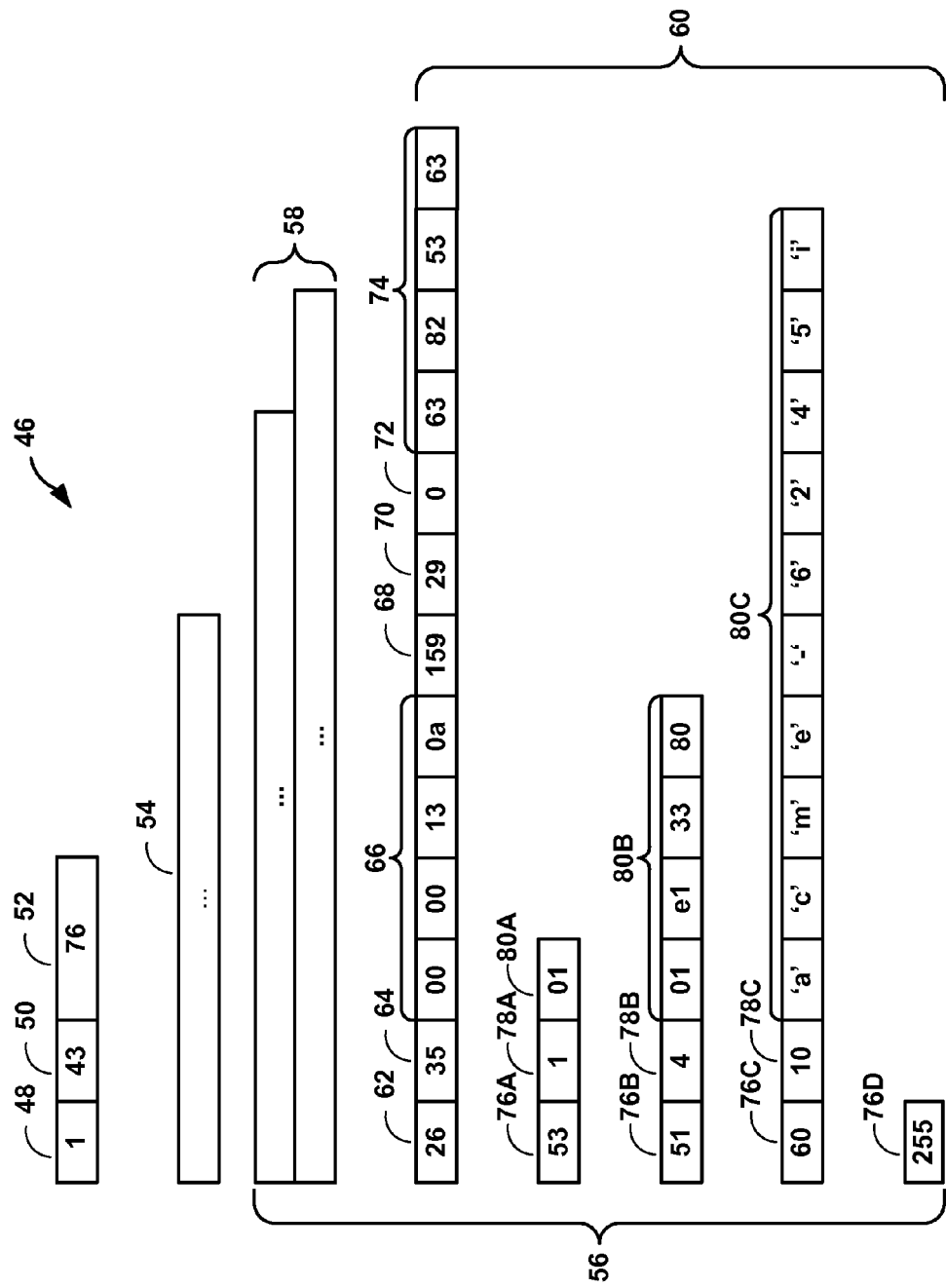
FIG. 3 is a block diagram illustrating an example RADIUS Access-Request packet.

FIG. 3 is a block diagram illustrating an example RADIUS Access-Request packet consistent with this disclosure. In Access-Request packet 46, code 48 is an octet that specifies the type of the RADIUS packet. For example, if code 48 is set to one, the RADIUS packet is identified as an Access-Request packet, whereas if the code is set to two, the RADIUS packet is identified as an Access-Accept packet. Identifier 50 is an octet that aids in matching requests and replies. RADIUS server 14 can detect a duplicate request if the request has the same client source IP address, source User Datagram Protocol (UDP) port, and identifier within a short period of time. Length 52 is made up of two octets and specifies the length of the packet including code 48, identifier 50, length 52, request authenticator 54, and attributes 56. Request authenticator 54 has sixteen octets that are set to different values based upon the value of code 48. If code 48 identifies the packet as an Access-Request packet, for example, request authenticator 54 is set to a sixteen octet long random number. If code 48 identifies the packet as an Access-Accept packet, request authenticator 54 may be set to a one-way message digest algorithm five (MD5) hash.

Attributes 56 is variable in length, and contains the list of attributes required for the particular packet type, i.e. Access-Request or Access-Accept packet, as well as any optional attributes. In accordance with this disclosure, attributes 56 may include DHCP attributes in addition to the required non-DHCP attributes. Access-Request packet 46 includes both non-DHCP attributes 58 and DHCP attributes. DHCP attributes may be encoded as VSAs. In general, VSAs allow vendors to support their own extended attributes not suitable for general use.

VSA 60 includes octets for type 62, length 64, and vendor-ID 66. In general, when an attribute of attributes 56 is a VSA, type 62 is an octet set to the value twenty-six because the value twenty-six identifies the attribute as a VSA. Length 64 is an octet that specifies the length of the attribute, including type 62, length 64, vendor-ID 66, and the other octets following vendor-ID 66 in VSA 60. Vendor-ID 66 is four octets long and is set to the SMI Network Management Private Enterprise Code of the vendor, in network byte order, as defined in RFC 1700.

Following vendor-ID 6 are a number of octets that make up a string containing the vendor-specific information for the VSA. In VSA 60, the string includes vendor type 68, vendor length 70, and fragment number 72. Vendor type 68 is vendor specific and identifies the type of the VSA. Vendor length 70 specifies the length of the string containing the vendor-specific information and includes the length all of the octets of VSA 60 except for type 62, length 64, and vendor-ID 66.

When the DHCP options include more information than may be encoded within a single VSA, the DHCP options may be fragmented across two or more VSAs. Fragment number 72 identifies the fragmented DHCP options in a predictable order. If the DHCP options fit within a single VSA, fragment number 72 may be set to zero. If the DHCP options are fragmented, fragment number 72 of the first VSA may be set to one and a second fragment number 72 of a second VSA may be set to two, for example. In general, fragment number 72 facilitates the decoding of the DHCP options encoded in the VSAs. In the example shown in FIG. 3, the DHCP options fit within a single VSA. Rather than fragmenting DHCP options across two or more VSAs, the DHCP options may also be truncated to fit within a single VSA. If the DHCP server and RADIUS server are configured to truncate DHCP options rather than fragment DHCP options across two or more VSAs, fragment 72 may be excluded from the VSA.

VSA 60 may include DHCP options specified in a DHCP discover packet. As shown in FIG. 3, DHCP options may include magic cookie 74, option codes 76A-76D (collectively, "option codes 76"), option lengths 78A-78C (collectively, "option lengths 78"), and option information 80A-80C (collectively, "option information 80"). Magic cookie 74 provides a sanity check when processing the DHCP packet. Option codes 76, option lengths 78 and option information 80 collectively specify a set of DHCP options. Configuration parameters and other control information are carried in tagged data items that are stored in the set of DHCP options. Each of option codes 76 uniquely identifies the corresponding DHCP option. For example, option code 76A is set to the value fifty-three. Fifty-three corresponds to an option that specifies the message type of the DHCP packet. Option 76D includes an option code, but no other information. Option code 76D is set to two-hundred and fifty-five, which corresponds to the "end option." The end option is the option that specifies that there are no additional options in the options field, that is, the end of the options field. Option lengths 78 follows each of option codes 76 for variable length options and fixed length options with data. For each of option lengths 78, the length specified by option length 78 does not include the length of the corresponding one of option code 76 or the length of option length 78, itself. Rather, option length 78 specifies the length of the data following option length 78. Option information 80 stores information for each option in the octets immediately following each option length 78. Each of option information 80 includes as many octets of information as specified in each respective option length 78.

DHCP server 12 may encode the values of the DHCP options of a DHCP discover packet into one VSA 60 with or without modification. DHCP server 12 may exclude one or more octets originally included in a DHCP discover packet, such as a magic cookie and a DHCP header, when encoding the DHCP options into VSA 60. DHCP server 12 may also encode additional octets, such as fragmentation number 72, that are not included in a DHCP discover packet.

Figure 4:
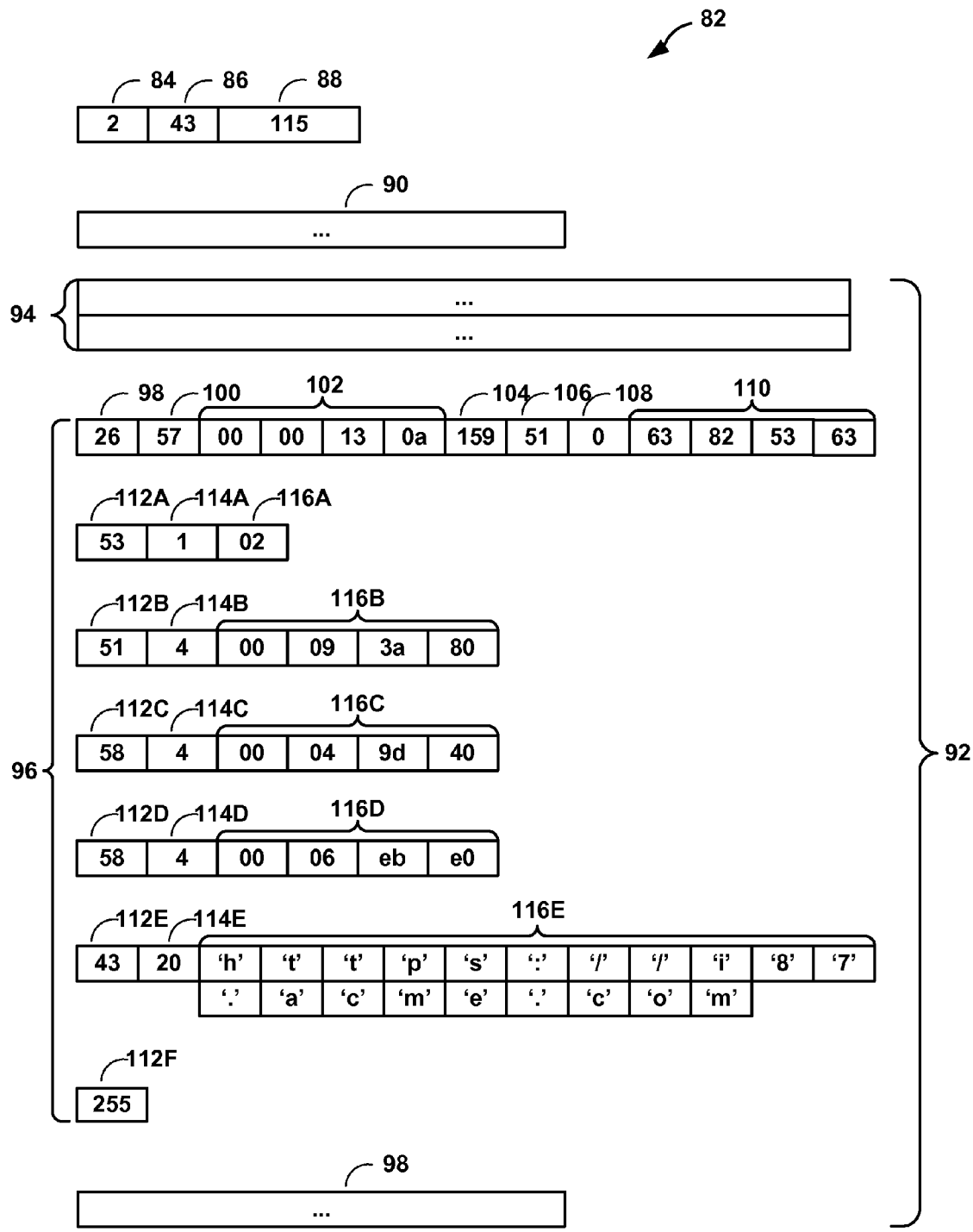
FIG. 4 is a block diagram illustrating an example RADIUS Access-Accept packet.

FIG. 4 is a block diagram illustrating an example RADIUS Access-Accept packet consistent with this disclosure. Access-Accept packet 82 maintains the same format as Access-Request packet 46, but is identified as an Access-Accept packet because code 84 is set to the value two. Identifier 86 is set to the same value as identifier 86 of the Access-Request packet 46 to identify the corresponding Access-Request packet that caused RADIUS server 14 to generate the Access-Accept packet. Length 88 is made up of two octets and specifies the length of the packet including code 84, identifier 86, length 88, authenticator 90, and attributes 92. Response authenticator 90 is set to a value based on the value of request authenticator 54.

Attributes 92 is variable in length, and contains the list of attributes required for the particular packet type, as well as any optional attributes. In accordance with this disclosure, attributes 92 may include DHCP attributes in addition to the required non-DHCP attributes. Access-Accept packet 82 includes both non-DHCP attributes 94 and 98, as well as DHCP attributes, which may be encoded as one or more VSAs. VSA 96 includes octets for type 98, length 100, and vendor-ID 102. Type 98 is an octet set to the value twenty-six because the value twenty-six identifies the attribute as a VSA. Length 100 is an octet that specifies the length of the attribute, including type 98, length 100, vendor-ID 102, and the other octets following vendor-ID 102 in VSA 96. Vendor-ID 102 is four octets long and is set to the SMI Network Management Private Enterprise Code of the vendor, in network byte order, as defined in RFC 1700.

Following vendor-ID 102 in VSA 96 are a number of octets that make up a string containing the vendor-specific information for the VSA. In VSA 96, the string includes vendor type 104, vendor length 106, and fragment number 108. Vendor type 104 is vendor specific and identifies the type of the VSA. Vendor length 106 specifies the length of the string containing the vendor-specific information and includes the length all of the octets of VSA 96 except for type 98, length 100, and vendor-ID 102.

If more DHCP options are to be encoded in Access-Accept packet 82 than will fit in a single VSA, RADIUS server 14 encodes the DHCP options in the same manner as the DHCP options were encoded in Access-Request packet 46. For example, if the DHCP options were fragmented across two or more VSAs in the Access-Request packet 46, then RADIUS server 14 is expected to fragment the DHCP options in Access-Accept packet 82 across two or more VSAs. Similarly, if the DHCP options are truncated in Access-Request packet 46, RADIUS server 14 is expected to truncate the DHCP options in the Access-Accept packet 82. A configuration option may be set in DHCP server 12, RADIUS server 14, or both servers to specify whether DHCP options should be fragmented or truncated when the encoded DHCP options are longer than will fit in a single VSA.

The DHCP options generated by RADIUS server 14 are included in VSA 96. The DHCP options may be based upon local configuration information or based on the result of attempting to authenticate the client device using the authentication information included in Access-Request packet 46. In the example shown in FIG. 4, the RADIUS server modified the DHCP options included in Access-Request packet 46 and included additional DHCP options. RADIUS server 14 may also exclude one or more octets that are included in Access-Request packet 46, such as removing vendor ID 102. However, RADIUS server 14 is not required to modify the DHCP options included in the Access-Request packet 46. Magic cookie 110, option codes 112A-112F, option lengths 114A-114E, and option information 116A-116E each correspond to valid DHCP options. In VSA 96, RADIUS server 14 set vendor type 104 to the value one hundred fifty-nine, indicating that the attributes encoded within VSA 96 correspond to DHCP options.

After RADIUS server 14 generates Access-Accept packet 82, RADIUS server 14 transmits the Access-Accept packet 82 to DHCP server 12 via network link 22B. If DHCP server 12 receives an Access-Reject packet from RADIUS server 14, DHCP server 12 may not generate and transmit a DHCP offer packet to client device 16. If DHCP server 12 receives an Access-Accept packet from RADIUS server 14, DHCP server 12 generates a DHCP offer packet based on the Access-Accept packet.

DHCP server 12 and a RADIUS server 14 may each be configured using a set of configuration flags to control how DHCP options are handled by DHCP server 12 and RADIUS server 14. For example, a global configuration flag may enable or disable sending DHCP options from DHCP server 12 to RADIUS server 14. Another configuration flag may cause DHCP server 12 and/or RADIUS server 14 to include or exclude various options fields that may be included in a conventional DHCP packet. For example, the configuration flag may cause the magic cookie, end option, message type, or parameter request list option to be included or excluded from the DHCP options transmitted between DHCP server 12 and RADIUS server 14. As another example, a configuration flag may enable or disable the fragmentation of the DHCP options into two or more VSAs.

When DHCP server 12 generates DHCP offer packet 118, various configuration flags may control whether DHCP server 12 is permitted to include additional DHCP options, e.g., DHCP options not included in Access-Accept packet 82, in DHCP offer packet 118. The configuration flags may also control whether DHCP server 12's local configuration could override any options specified by RADIUS server 14 by controlling whether DHCP server 12 is allowed to modify the DHCP options included in Access-Accept packet 82. In another example, a configuration flag may control whether DHCP server 12 should remove all duplicate DHCP options before sending DHCP offer packet 118 to client device 16, while another configuration flag may control whether duplicate instances of particular DHCP options should be removed before sending DHCP offer packet 118 to client device 16.

Figure 5:
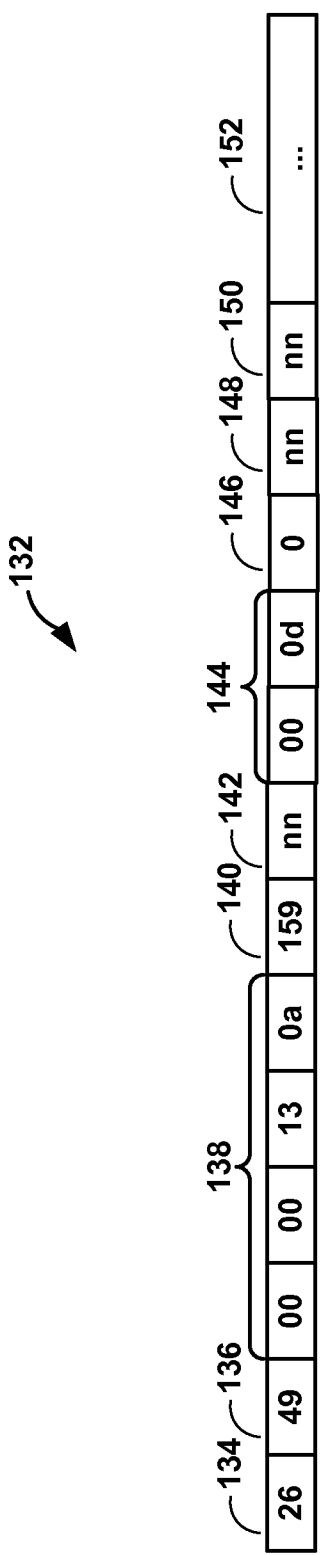
FIG. 5 is a block diagram illustrating an example vendor specific attribute of a RADIUS packet specifying runtime configuration information.

DHCP server 12 and RADIUS server 14 may also be configured on a runtime basis using octets within one or more VSAs in Access-Request packets or Access-Accept packets, as shown in FIG. 5. VSA 132 includes type 134, length 136, vendor-ID 138, vendor type 140, vendor length 142, flags 144, fragmentation number 146, option code 148, option length 150, and option information 152. Type 134, length 136, vendor-ID 138, vendor type 140, vendor length 142, fragmentation number 146, option code 148, and option length 150 are similar to the corresponding octets shown in FIGS. 3 and 4. Option information 152 is the value of the particular option specified by option code 148. Flags 144 specifies the runtime configuration option. The value stored in flags 144 may, as examples, indicate that no magic cookie is present in the VSA, that the fragmentation field is present in the VSA, that additional DHCP options from the DHCP server are allowed, that modification of RADIUS-specified DHCP options are not allowed, or that DHCP server 12 should strip all duplicate DHCP options before sending DHCP offer packet 118 to client device 16. Flags 144 may also store a value that indicates some combination of two or more configuration options.

Figure 6:
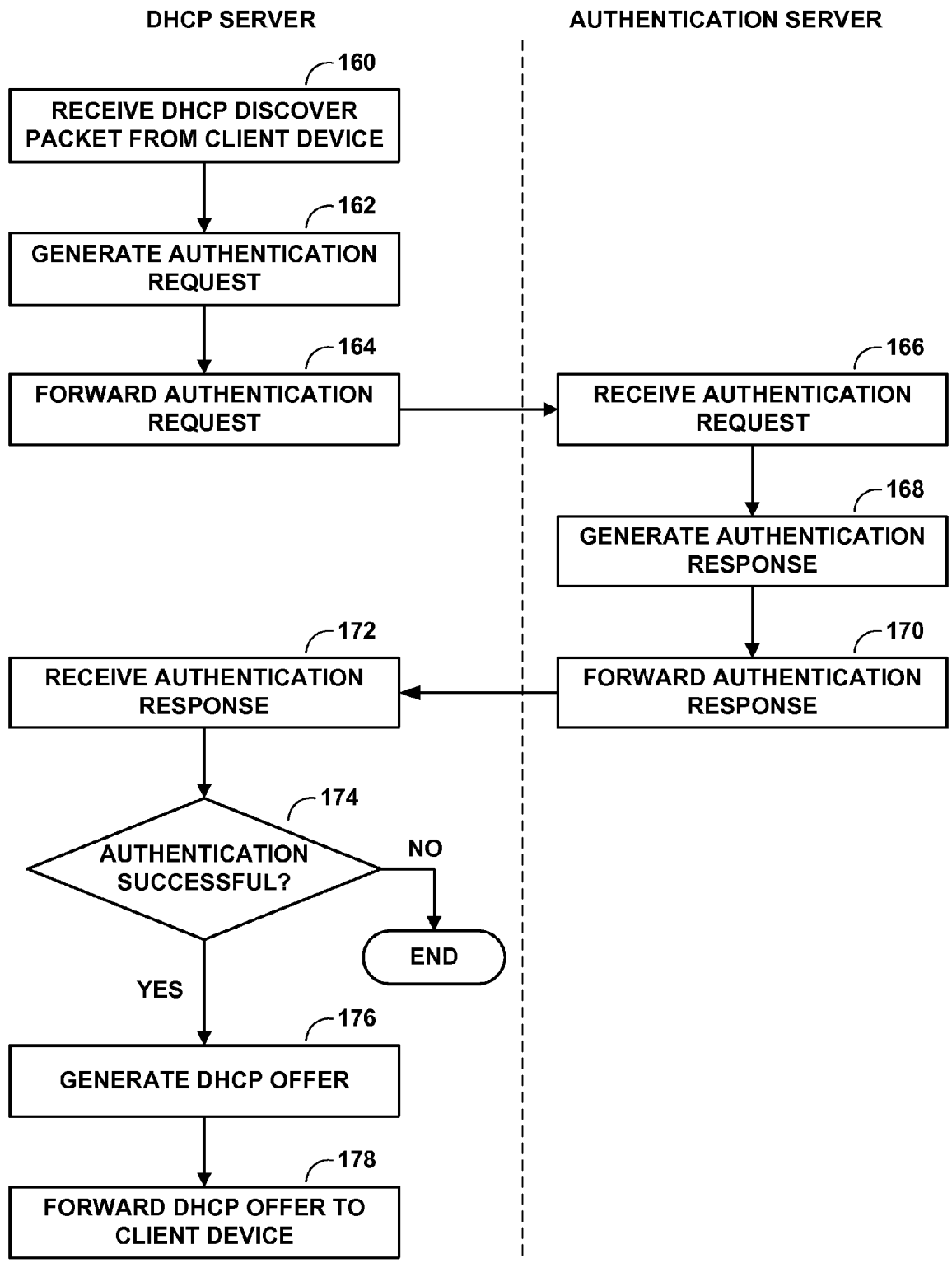
FIG. 6 is a flow chart illustrating exemplary operation of the network system in performing the techniques of the disclosure.

FIG. 6 is a flow chart illustrating exemplary operation of the network system in performing the techniques of the disclosure. For purposes of clarity, the method shown in FIG. 7 will be described with respect to network system 10 shown in FIG. 1. DHCP server 12 receives a DHCP discover packet from client device 16 via network link 20A (160). The DHCP discover packet includes a set of DHCP options specified by client device 16. DHCP server 12 generates an authentication request (162) based on the DHCP discover packet. In generating the authentication request, DHCP server 12 may encode any or all of the DHCP options specified by client device, modify the values associated with each DHCP option specified by client device 16, and/or encode additional DHCP options not specified by client device 16 into VSAs of the authentication request. The maximum VSA size supported by an authentication protocol may be less than the required supported DHCP options field size as specified by the DHCP protocol. Therefore, the DHCP options may need to be truncated to fit within a single VSA or the DHCP options may need to be fragmented and spanned across more than one VSA.

After DHCP server 12 generates the authentication request, DHCP server 12 forwards the authentication request to RADIUS server 14 via network link 22A (164) using a network protocol, such as TCP/IP. RADIUS server 14 receives the authentication request (166) and generates an authentication response (168). In generating the authentication response, RADIUS server 14 extracts authentication information, such as a username and password combination or a network ID and password combination, and authenticates client device 16 based on the authentication information. If the authentication is successful, RADIUS server 14 generates an Access-Accept packet as the authentication response (168). RADIUS server 14 may modify the DHCP options included in the authentication request based on the authentication attempt and local configuration information. For example, when encoding a set of DHCP options in the authentication response, RADIUS server 14 may modify the values of one or more DHCP options encoded in the authentication request, may add DHCP options not encoded in the authentication request, or may not include DHCP options included in the authentication request. In generating the authentication response, RADIUS server 14 re-encodes the DHCP options in the same manner as received in the authentication request and includes the authentication response.

RADIUS server 14 forwards the authentication response to DHCP server 12 via network link 22B (170). DHCP server 12 receives the authentication response (172) and determines if authentication was successful (174). If the authentication response corresponded to a failed authentication attempt (NO in 174), DHCP server 12 does not generate a DHCP offer and the method terminates. If the authentication response corresponds to a successful authentication attempt (YES in 174), DHCP server 12 generates a DHCP offer based on the DHCP options encoded in the authentication response (176). DHCP server 12 may pass the DHCP options encoded in the authentication response directly into DHCP offer, or modify the DHCP options in accordance with the local configuration information. After DHCP server 12 generates the DHCP offer (176), DHCP server 12 forwards the DHCP offer to client device 16 via network link 20B.

In this manner, RADIUS server 14 may modify DHCP options based on authentication information passed to RADIUS server 14 from client device 16 via DHCP server 12. By enabling RADIUS server 14 to give DHCP server 12 a set of DHCP options, an administrator may more easily configure and control the contents of the DHCP offer field and, thus, may more easily configure network information associated with client device 16.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause one or more programmable processors, or other processors, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
   receiving, with an authentication, authorization, and accounting (AAA) server from a network device, an authentication request configured in accordance with a AAA protocol, wherein the authentication request includes a request for a first set of network configuration parameters for a client device and a set of authentication attributes, wherein each authentication attribute from the set of authentication attributes has a maximum size defined by the AAA protocol, wherein a size of the request for the first set of network configuration parameters is larger than the maximum size, and wherein the request for the first set of network configuration parameters is at least one of encoded in two or more authentication attributes from the set of authentication attributes or truncated such that the truncated request for the first set of network configuration parameters has a size that is less than or equal to the maximum size;
   determining, based on the authentication information and the first set of network configuration parameters, a second set of network configuration parameters for the client device;
   generating, with the AAA server, an authentication response message configured in accordance with the AAA protocol, wherein the authentication response message includes the second set of network configuration parameters; and
   transmitting, from the AAA server to the network device, the authentication response message using the AAA protocol.

2. The method of claim 1, further comprising:
   when the request for the first set of network configuration parameters is encoded in two or more authentication attributes from the set of authentication attributes:
      extracting, with the AAA server, each portion of the request for the first set of network configuration parameters encoded in each of the two or more authentication attributes; and
      reassembling, with the AAA server, the request for the first set of network configuration parameters from the portions of the request for the first set of network configuration parameters extracted from the two or more authentication attributes.

3. The method of claim 1, further comprising:
   when the request for the first set of network configuration parameters is truncated such that the truncated request for the first set of network configuration parameters has a size that is less than or equal to the maximum size:
      extracting, with the AAA server, the truncated request for the first set of network configuration parameters from the authentication request message;
      translating, with the AAA server, the truncated request for the first set of network configuration parameters into the request for the first set of network configuration parameters; and
      generating, based at least in part on the request for the first set of network configuration parameters and with the AAA server, the authentication response message.

4. The method of claim 1, further comprising:
   when the request for the first set of network configuration parameters is truncated such that the truncated request for the first set of network configuration parameters has a size that is less than or equal to the maximum size:
      extracting, with the AAA server, the truncated request for the first set of network configuration parameters from the authentication request message; and
      generating, based at least in part on the truncated request for the first set of network configuration parameters and with the AAA server, the authentication response message.

5. The method of claim 1,
   wherein the set of authentication attributes included in the authentication request comprises a first set of authentication attributes,
   wherein the authentication response message includes a second set of authentication attributes each having a maximum size, and
   wherein generating the authentication response message further comprises:
      determining, with the AAA server, that a size of the second set of network configuration parameters is greater than the maximum size;
      generating, based on the second set of network configuration parameters, a truncated set of network configuration parameters, wherein a size of the truncated set of network configuration parameters is less than or equal to the maximum size; and
      encoding, with the AAA server, the truncated set of network configuration parameters into one of the second set of authentication attributes.

6. The method of claim 1,
wherein the set of authentication attributes included in the authentication request comprises a first set of authentication attributes,
wherein the authentication response message includes a second set of authentication attributes each having a maximum size, and
wherein generating the authentication response message further comprises:
  determining, with the AAA server, that a size of the second set of network configuration parameters is greater than the maximum size;
  fragmenting, with the AAA server, the second set of network configuration parameters into two or more subsets of network configuration parameters, wherein each of the two or more subsets of network configuration parameters has a size that is less than or equal to the maximum size; and
  encoding each of the two or more subsets of network configuration parameters into a respective authentication attribute from the second set of authentication attributes.

7. The method of claim 1, wherein each of the network configuration parameters from the second set of network configuration parameters is encoded in one of the set of authentication attributes.

8. The method of claim 1, wherein the network device comprises a dynamic host control protocol (DHCP) server, wherein the first set of network configuration parameters comprises a first set of DHCP options, and wherein the second set of network configuration parameters comprises a second set of DHCP options.

9. The method of claim 1, wherein determining the second set of network configuration parameters comprises:
  executing, with the AAA server, an authentication process using the set of authentication attributes to determine an authentication result; and
  generating, with the AAA server, based on the authentication result and the first set of network configuration parameters, the second set of network configuration parameters.

10. A network device comprising:
  one or more processors;
  one or more network interfaces configured to receive an authentication request configured in accordance with an authentication, authorization, and accounting (AAA) protocol, and send an authentication response message configured in accordance with the AAA protocol, wherein the authentication request includes a request for a first set of network configuration parameters for a client device and a set of authentication attributes, wherein the first set of network configuration parameters are configured in accordance with a network address allocation and configuration protocol, wherein each authentication attribute from the set of authentication attributes has a maximum size defined by the AAA protocol, wherein a size of the request for the first set of network configuration parameters is larger than the maximum size, and wherein the request for the first set of network configuration parameters is at least one of encoded in two or more authentication attributes from the set of authentication attributes or truncated such that the truncated request for the first set of network configuration parameters has a size that is less than or equal to the maximum size; and
  a AAA module operable by the one or more processors to determine, based on the authentication information and the first set of network configuration parameters, a second set of network configuration parameters for a client device and configured in accordance with the network address allocation and configuration protocol, and generate the authentication response message, wherein the authentication response message includes the second set of network configuration parameters.

11. The network device of claim 10,
wherein the AAA module is further operable by the one or more processors to, when the request for the first set of network configuration parameters is encoded in two or more authentication attributes from the set of authentication attributes, extract each portion of the request for the first set of network configuration parameters encoded in each of the two or more authentication attributes, and reassemble the request for the first set of network configuration parameters from the portions of the request for the first set of network configuration parameters extracted from the two or more authentication attributes.

12. The network device of claim 10, wherein the AAA module is further operable by the one or more processors to, when the request for the first set of network configuration parameters is truncated, extract the truncated request for the first set of network configuration parameters from the authentication request message, translate the truncated request for the first set of network configuration parameters into the request for the first set of network configuration parameters, and generate, based at least in part on the request for the first set of network configuration parameters, the authentication response message.

13. The network device of claim 10, wherein the AAA module is further operable by the one or more processors to, when the request for the first set of network configuration parameters is truncated, extract the truncated request for the first set of network configuration parameters from the authentication request message, and generate, based at least in part on the truncated request for the first set of network configuration parameters, the authentication response message.

14. The network device of claim 10,
wherein the set of authentication attributes included in the authentication request comprises a first set of authentication attributes,
wherein the authentication response message includes a second set of authentication attributes each having a maximum size, and
wherein the AAA module is further operable by the one or more processors to determine that a size of the second set of network configuration parameters is greater than the maximum size, generate, based on the second set of network configuration parameters, a truncated set of network configuration parameters, wherein a size of the truncated set of network configuration parameters is less than or equal to the maximum size, and encode the truncated set of network configuration parameters into one of the second set of authentication attributes.

15. The network device of claim 10,
wherein the set of authentication attributes included in the authentication request comprises a first set of authentication attributes,
wherein the authentication response message includes a second set of authentication attributes each having a maximum size, and
wherein the AAA module is further operable by the one or more processors to determine that a size of the second set of network configuration parameters is greater than the maximum size, fragment the second set of network configuration parameters into two or more subsets of network configuration parameters, wherein each of the two or more subsets of network configuration parameters has a size that is less than or equal to the maximum size, and encode each of the two or more subsets of network configuration parameters into a respective authentication attribute from the second set of authentication attributes.

16. The network device of claim 10, wherein each of the network configuration parameters from the second set of network configuration parameters is encoded in one of the set of authentication attributes.

17. The network device of claim 10, wherein the network address allocation and configuration protocol comprises a dynamic host control protocol (DHCP), and wherein the first set of network configuration parameters comprises a first set of DHCP option, and wherein the second set of network configuration parameters comprises a second set of DHCP options.

18. A computer-readable storage medium encoded with instructions for causing one or more programmable processors of a first network device to:

receive, from a second network device, an authentication request configured in accordance with an authentication, authorization, and accounting (AAA) protocol, wherein the authentication request includes a request for a first set of network configuration parameters and a set of authentication attributes, wherein each authentication attribute from the set of authentication attributes has a maximum size defined by the AAA protocol, wherein a size of the request for the first set of network configuration parameters is larger than the maximum size, and wherein the request for the first set of network configuration parameters is at least one of encoded in two or more authentication attributes from the set of authentication attributes or truncated such that the truncated request for the first set of network configuration parameters has a size that is less than or equal to the maximum size;

determine, based on the authentication information and the first set of network configuration parameters, a second set of network configuration parameters;

generate an authentication response message configured in accordance with the AAA protocol, wherein the authentication response message includes the second set of network configuration parameters for a client device; and transmit, to the second network device, the authentication response message using the AAA protocol.

* * * * *